United States Patent [19]
Taormino et al.

[11] Patent Number: 6,019,422
[45] Date of Patent: Feb. 1, 2000

[54] LATERALLY PIVOTING BICYCLE SADDLE MOUNT WITH SHOCK ABSORBER

[76] Inventors: Joseph S. Taormino, 18575 Rosalind La., San Jose, Calif. 95120; Reginald L. Caselli, Jr., 1463 Mercer Ave., San Jose, Calif. 95125

[21] Appl. No.: 09/096,290

[22] Filed: Jun. 10, 1998

[51] Int. Cl.[7] .................................. B60N 2/40; B62J 1/04
[52] U.S. Cl. .................. 297/195.1; 297/313; 297/314
[58] Field of Search ............................... 297/195.1, 313, 297/314, 201

[56] References Cited

U.S. PATENT DOCUMENTS

| | | | |
|---|---|---|---|
| 2,707,986 | 5/1955 | Johnson | 297/314 |
| 3,583,758 | 6/1971 | Radford | 297/314 |
| 4,062,585 | 12/1977 | Herring, Jr. | 297/195.1 |
| 5,443,301 | 8/1995 | Lai | 297/195.1 |
| 5,489,139 | 2/1996 | McFarland | 297/195.1 |
| 5,524,967 | 6/1996 | Glockl | 297/314 |
| 5,551,753 | 9/1996 | Glockl | 297/314 |
| 5,570,929 | 11/1996 | Glockl | 297/313 |
| 5,573,304 | 11/1996 | Glockl | 297/314 |
| 5,590,930 | 1/1997 | Glockl | 297/313 |
| 5,702,093 | 12/1997 | Liao | 297/195.1 |
| 5,769,492 | 6/1998 | Jensen | 297/314 |
| 5,855,410 | 1/1999 | Lin | 297/195.1 |

FOREIGN PATENT DOCUMENTS

| | | | |
|---|---|---|---|
| 93432 | 11/1996 | Germany | 297/201 |

*Primary Examiner*—Peter M. Cuomo
*Assistant Examiner*—Rodney B. White
*Attorney, Agent, or Firm*—Thomas Schneck

[57] ABSTRACT

A mounting for a bicycle saddle which allows lateral rocking with respect to a seat post. The mounting features a platform spaced apart from a shoe member by a cylindrical elastomer, with the platform and shoe member maintaining mutual contact through use of a pivot member. The pivot extends downwardly from the platform and fits into a toe portion of the shoe member, while a rearward heel of the shoe member seats the elastomeric cylinder. The forward pivot member allows rocking of the platform and seat, while the rearward elastomeric cylinder provides some shock absorption, depending upon tension placed on the cylinder. The shoe has a pair of rails on the underside with the same spacing and cross-sectional shape as seat rails. This allows the shoe to be fastened to a seat post with a conventional clamp. The same type of clamp is used for securing a bicycle seat to the upper side of the platform.

20 Claims, 4 Drawing Sheets

LATERALLY PIVOTING BICYCLE SADDLE MOUNT WITH SHOCK ABSORBER

TECHNICAL FIELD

The invention relates to bicycle seat mounts and, more particularly, to a seat mount adaptive to rider motion.

BACKGROUND ART

The quadriceps are among the most powerful muscles in the human body. The power of the quadriceps, and to a lesser extent, the glutei maximus, are partly responsible for the success of the bicycle as a human powered vehicle. Most cyclists riding conventional cycles find that while quadriceps can be built up by exercise to high levels of endurance, seat pressure is a limiting factor on durations of rides. Much of the weight of a rider is transferred to the bicycle through the seat. Considerable effort has been devoted to softening seats with padding or designing seat surfaces to provide greater rider comfort.

Bicycle seats with deformable padding, such as gel, are known to be adaptive to rider motion. Also, seat posts with internal elastomeric cylinders provide spring-like shock absorption.

A series of U.S. patents to J. Glockl, including U.S. Pat. Nos., 5,524,967; 5,573,304; 5,570,929; 5,590,930 and 5,551,753 all deal with seats which can tilt in all lateral directions. In many other instances, auxiliary members provide spring action immediately below the seat. The inventions of Glockl relate to furniture which is to be used to avoid degeneration of the back muscles and wasting of intervertebral disks.

U.S. Pat. No. 3,583,758 describes a car seat which is mounted to provide rotation upon turning of the car. The hips of an occupant of the seat move with the seat, compensating for centrifugal forces occasioned by out-of-line movement of the vehicle, such as maneuvering on unbanked curves.

While efforts of the prior art are meritorious for their intended purposes, few completely address the problem of rider discomfort from bicycle pedaling. One object of the invention was to devise a bicycle saddle which more completely reduces rider discomfort after lengthy pedaling.

SUMMARY OF THE INVENTION

The above object has been met with an adaptive mounting for a bicycle saddle which allows lateral pivoting or rolling in response to human seat motion in pedalling, as well as providing downward compressibility for shock absorption. The mounting has a platform with upper and lower surfaces, the upper surface clamped to a bicycle seat and the lower surface contacting an elastomeric cylinder seated on a shoe, allowing reciprocatory rolling of the upper surface of the mounting, as well as downward compression, while the shoe is joined to a bicycle seat post. The shoe has toe and heel portions joined by a base. The elastomeric cylinder is supported by the heel and provides shock absorption. The lower surface of the platform has a downwardly projecting, rotatable, forward pivot which fits in the toe portion of the shoe. The downwardly projecting pivot rolls about an axis parallel to the direction of travel of the bicycle in the toe and heel of the shoe.

The elastomeric cylinder allows free-axial passage of a bolt extending from the base, secured by a nut over a cap on the cylinder. The cap is independent of the platform, so that the platform can be forced downwardly, as well as roll, while the cap, bolt and nut remain in a fixed position. The elastomeric cylinder is sufficiently thick, approximately 0.5 inch in radius, that compression of one side of the cylinder, then the opposite side, as well as downward compression, provides for rider comfort. BRIEF DESCRIPTION OF THE DRAWINGS FIG. 1 is a side view of the apparatus of the present invention.

BEST MODE FOR CARRYING OUT THE INVENTION

Figure 1:
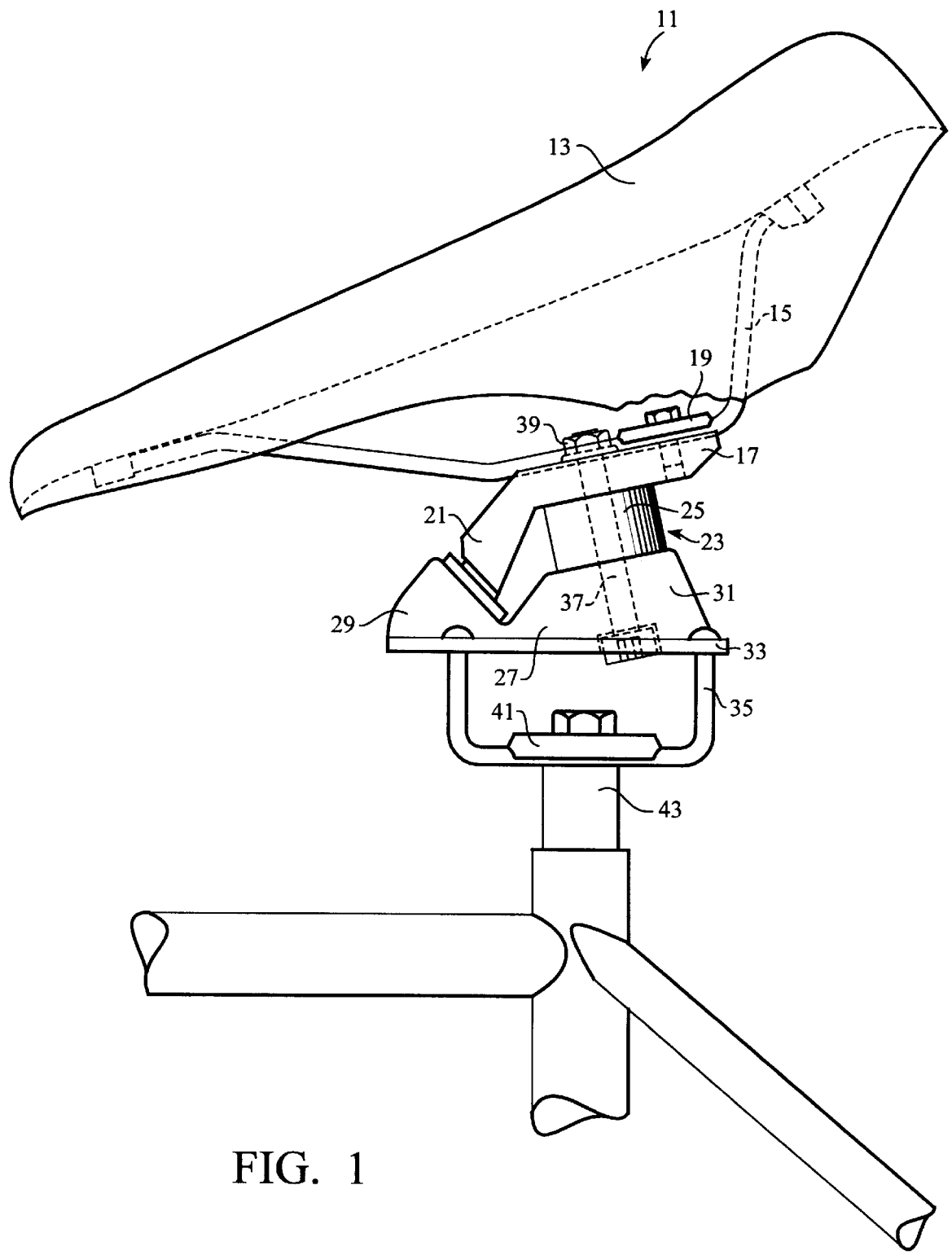

With reference to FIG. 1, a bicycle saddle assembly 11 is shown to include a conventional bicycle saddle 13 having a pair of saddle rails 15 which are connected to a platform 17 by means of a saddle clamp 19. Saddle clamp 19 is a conventional hold-down bracket used for attaching bicycle saddles to seat posts. The platform 17 includes a forward pivot portion 21, as well as a rearward portion 23. Both the forward and rearward portions make contact with a shoe 27. Rearward pivot portion 23 has an elastomeric cylinder 25 spacing the platform 17 from the shoe 27. Elastomeric cylinder 25 has a hollow central axis along which a bolt 37 freely passes and which is retained in place by nut 39.

Shoe 27 includes a forward toe 29 with a rounded aperture into which the front pivot 21 of platform 17 is inserted. A rearward portion of shoe 27 has a heel 31 which receives the elastomeric cylinder 25. Both the toe 29 and heel 31 are integral with a base 33 which has a peripheral portion with screws which attach to shoe rails 35 having the same spacing as saddle rails 15. Shoe rails 35 are attached to a bicycle seat post 43 by means of a post clamp 41.

Figure 2:
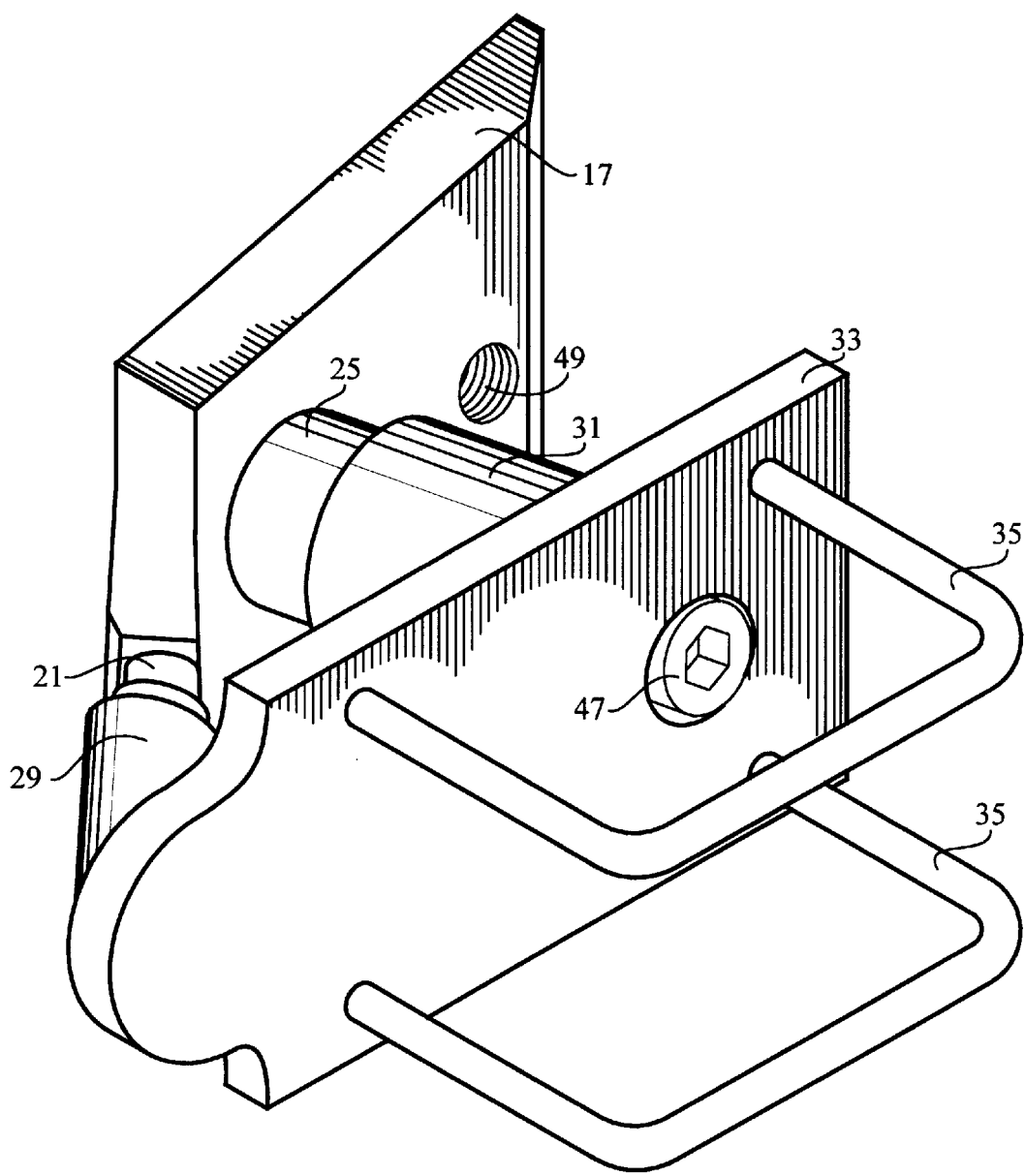
FIG. 2 is a bottom perspective view of a portion of the apparatus illustrated in FIG. 1 without a bicycle seat.

In FIG. 2, the pair of shoe rails 35 may be seen to be supported from base 33, thereby providing a means for mounting to a bicycle seat post. Other mounting devices could be readily used, but the use of rails is compatible with seat post brackets used today. The rails 35 have the same cross-sectional dimensions as saddle rails used for mounting saddles to seat posts. Similarly, the shoe rails have the same spaced apart relation as saddle rails. The shoe rails are typically made of steel, with a slight amount of grinding at corners where bends exist. The rails are held in place by screws from the upper side of base 33.

Base 33, heel 31 and toe 29 are part of an integrally formed aluminum casting, although other materials could be used. Heel 31 seats the elastomeric cylinder 25, while toe 29 seats the forward pivot 21 of platform 17. A threaded aperture 49 in platform 17 receives a bolt from a saddle clamp which holds the saddle rails in place. Bolt head 47 is seen in the bottom of base 33 with a hexagonal aperture for a bolt tightening tool. Since the nut on the opposite side of the bolt may be difficult to reach, the bolt head 47 provides a convenient way to adjust tension on the elastomeric cylinder. A greater amount of tension will limit the amount of vertical compression.

Figure 3:
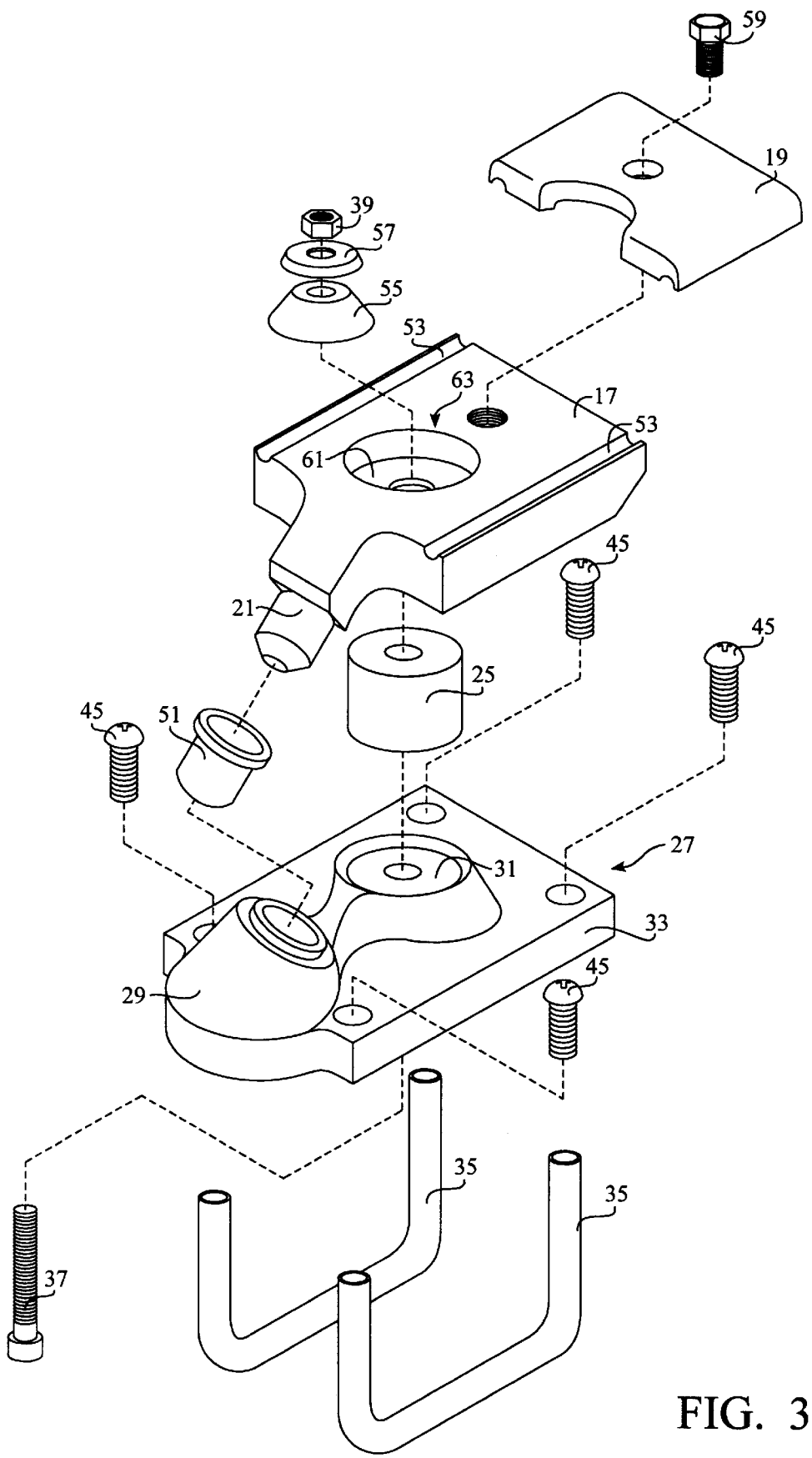
FIG. 3 is an exploded view of the apparatus shown in FIG. 2.

With reference to FIG. 3, base 33 is seen to be a central support from both its upper and lower surfaces. On the lower surface, the shoe rails 35 are held in place with screws 45. On the upper surface, elastomeric cylinder 25 is seen to rest on heel 31 with both the elastomeric cylinder and the heel having a central aperture which admits free passage of bolt 37 into and through platform 17. The toe 29 accommodates a toe bushing 51 which is rubber or plastic, receiving the forward pivot portion 21 of platform 17. Base 33 has a length along a lateral edge in the direction of travel of approximately 2.5 inches and a width of approximately 2 inches. The elastomeric cylinder 25 has a diameter of approximately 1 inch and a height of approximately 5/8 of an inch. Toe bushing 51 has an outside diameter of approximately 3/4 of an inch.

To change the degree of stiffness in shock absorption, the elasticity of the elastomeric cylinder 25 may be selected, by choice of material, or adjusted by turning nut 39. To limit the amount of rocking and provide a stiffer saddle support, a cylinder which is moderately firm may be selected. To provide a greater degree of rocking, elastomeric cylinders with greater softness are selected. It will be seen that platform 17 has an annular ridge 61 inside of bore 63. The ridge is a lower side for contacting elastomeric cylinder 25, as well as an upper side for seating the elastomeric cone 55. The ridge 61 is quite close to the lower surface of platform 17, with the bore 63 penetrating through approximately three-fourths of the depth of platform 17. This allows cone 55 to occupy much of the space within platform 17, thereby providing clearance for side to side rocking of the platform 17. Cap 57 has a diameter smaller than the bore diameter and does not come into contact with platform 17. Cap 57 is held in place by nut 39, which is screwed to the end of bolt 37. A pair of grooves 53 have a spacing corresponding to the spacing of saddle rails and receive saddle rails in the groove. The saddle rails are clamped in place using saddle clamp 19 which is tightened with fastener 59, a small bolt.

Figure 4:
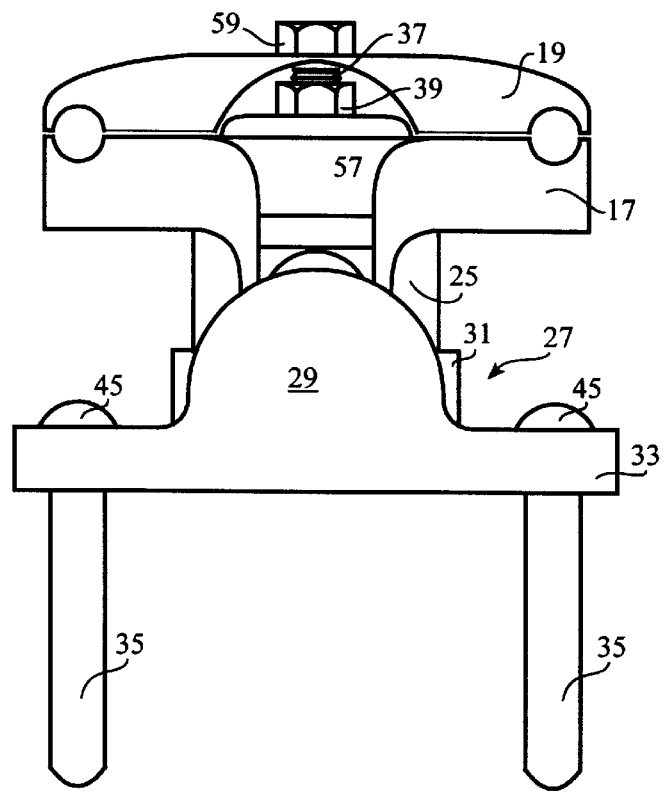
FIG. 4 is a front elevation view of the apparatus shown in FIG. 2.

With reference to FIG. 4, shoe 27 is seen to support platform 17 by means of the elastomeric cylinder 25 which may be compressed from above due to pressure of the saddle. Bolt 37 passes through the center of the elastomeric cylinder, but allows the cylinder to compress slightly. At the same time, platform 17 may rock laterally in response to pedalling by a rider sitting on a seat attached to the platform 17.

Figure 5:
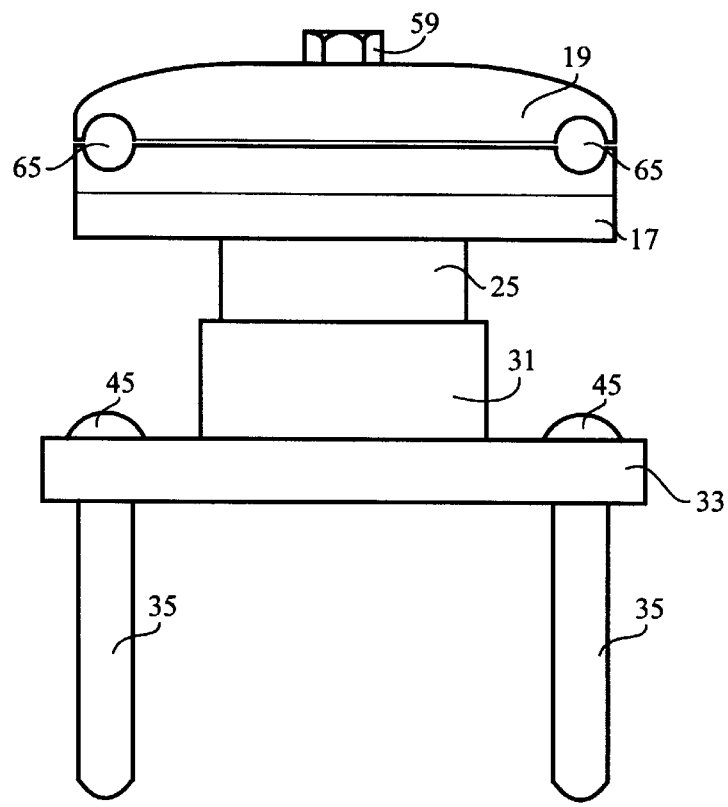
FIG. 5 is a rear elevation view of the apparatus shown in FIG. 2.

With reference to FIG. 5, the elastomeric cylinder 25 may be seen seated in heel 31 above base 33. Saddle clamp 19 has apertures 65 to receive saddle rails which are held in place by saddle clamp 19 and fastener 59. The spacing of aperture 65 corresponds to the spacing of shoe rails 35.

In operation, a bicycle seat is made part of a saddle assembly by clamping to the platform. In turn, the platform is bolted to the shoe, having rails which are received by a seat post clamp. While the entire apparatus is bolted together for permanent use, sections could be snap fit together. For example, the platform could be made to snap into the shoe with a cleat. In this manner, seats could be interchanged, or a seat could be removed for security.

We claim:

1. A mounting for a saddle of a bicycle comprising,
    a platform having opposed sides, including an upper side with means for mounting a bicycle scat thereto and a lower side having a downwardly and forwardly extending pivot member;
    a shoe with upper and lower surfaces, the upper surface having a toe receiving said pivot member and having a heel on which an elastomer rests, said elastomer having a first and second end wherein the first end is positioned in contact with said heel, wherein the second end is positioned in contact with the lower side of the platform; and
    a bicycle seat post secured to the lower surface of said shoe,
    wherein said pivot member is received in said shoe such that said platform laterally rocks from side to side about an axis lying in a plane extending in the normal forward riding direction of the bicycle.

2. The apparatus of claim 1 wherein said elastomer is cylindrical.

3. The apparatus of claim 2 wherein said cylindrical elastomer has an axial hole therethrough for allowing a bolt to pass freely therethrough, the bolt extending through said platform and said shoe linking the platform and the shoe.

4. The apparatus of claim 3 wherein said bolt has an indented head for receiving a tool, wherein the indented head extends partially into the shoe.

5. The apparatus of claim 1 wherein lower surface of the shoe includes a pair of spaced apart rails for mounting to a bicycle seat post.

6. The apparatus of claim 4 wherein said means for mounting a bicycle seat to the upper side of the platform comprises a pair of spaced apart grooves in the platform at substantially equal spacing as said spaced apart rails.

7. The apparatus of claim 1 wherein said means for mounting a bicycle seat to the upper side of the platform comprises a pair of spaced apart grooves in the platform.

8. The apparatus of claim 7 wherein said means for mounting a bicycle seat to the upper side of the platform further comprises a clamp with a set of clamp grooves fitting over the platform grooves for securing rails of a bicycle seat.

9. The apparatus of claim 1 wherein said pivot member is a boss, extending into a bushing which, in turn, is seated in the toe of said shoe.

10. The apparatus of claim 1 wherein the platform is at an acute angle relative to the lower surface of the shoe.

11. A mounting for a saddle of a bicycle which allows lateral rocking in response to pedaling comprising,
    a saddle support shoe, joinable to a bicycle seat post, having toe and heel portions supported by a base,
    a bicycle saddle assembly having a platform with upper and lower surfaces, the lower surface having a downwardly projecting forward pivot disposable in the toe portion of the shoe and having a downwardly projecting elastomeric cylinder supportable from the heel portion of the shoe, the upper surface having means for clamping a bicycle seat thereto,
    wherein the forward pivot and the elastomeric cylinder allow lateral rocking of the seat from side to side about an axis lying in a plane extending in the normal forward riding direction of the bicycle.

12. The apparatus of claim 11 wherein said bicycle saddle assembly is removable from the saddle support shoe.

13. The apparatus of claim 11 wherein said elastomeric cylinder is tubular, having an axially disposed bolt extending through said base of the saddle support shoe, through the cylinder and through said platform, thereby allowing compression of the elastomeric cylinder between the shoe and the platform.

14. The apparatus of claim 13 wherein said elastomeric cylinder extends partially into the platform.

15. The apparatus of claim 11 wherein said platform has an upper surface with parallel grooves, spaced apart by a distance equal to rail spacing on conventional bicycle seats, and having a rail clamping assembly thereon, wherein said saddle is formed by a conventional bicycle seat joined to platform by said rail clamping assembly.

16. The apparatus of claim 11 wherein said shoe has a lower surface with shoe rails thereon, spaced apart by a distance equal to rail spacing on conventional bicycle seats.

17. A mounting for a bicycle saddle which allows lateral rocking in response to pedaling comprising, a support shoe having toe and heel portions and having a base with a clamp for mounting the shoe to a bicycle seat post, a platform having a forward pivot portion disposed in the toe portion of the shoe and having a rearward portion supported from the heel portion of the shoe by an elastomeric cylinder, and a clamp means atop the platform for securing a bicycle saddle to the platform, wherein the forward pivot and the elastomeric cylinder allow lateral rocking of the saddle from side to side about an axis lying in a plane extending in the normal forward riding direction of the bicycle.

18. The apparatus of claim 17 wherein said elastomeric cylinder is tubular, having an axially disposed bolt extending through said base of the saddle support shoe, through the cylinder and through said platform, thereby allowing compression of the elastomeric cylinder between the shoe and the platform.

19. The apparatus of claim 17 wherein said elastomeric cylinder extends partially into the platform.

20. The apparatus of claim 17 wherein said shoe has a lower surface with shoe rails thereon, spaced apart by a distance equal to rail spacing on conventional bicycle seats.

* * * * *